United States Patent [19]
Parker et al.

[11] Patent Number: 4,578,718
[45] Date of Patent: Mar. 25, 1986

[54] CONTROL ARRANGEMENT AND METHOD FOR VIDEO TAPE RECORDER

[75] Inventors: Robert R. Parker, Wheeling; Dev R. Rattan, Chicago, both of Ill.

[73] Assignee: Bell & Howell Company, Skokie, Ill.

[21] Appl. No.: 504,914

[22] Filed: Jun. 16, 1983

[51] Int. Cl.⁴ .................................. H04N 5/782
[52] U.S. Cl. ............................. 360/10.3; 360/27
[58] Field of Search .............. 358/335, 342, 343; 360/9.1, 10.1, 10.2, 10.3, 11.1, 19.1, 14.1, 14.2, 14.3, 22, 23, 27, 32, 33.1, 38.1, 61

[56] References Cited
U.S. PATENT DOCUMENTS

| | | | |
|---|---|---|---|
| 4,353,098 | 10/1982 | Heinz et al. | 360/9.1 |
| 4,390,906 | 6/1983 | Furumoto et al. | 360/19.1 |
| 4,418,364 | 11/1983 | Wine | 358/335 |
| 4,433,347 | 2/1984 | Sugiyama et al. | 358/342 |
| 4,446,488 | 5/1984 | Suzuki | 338/342 |

*Primary Examiner*—Donald McElheny, Jr.
*Attorney, Agent, or Firm*—James V. Lapacek; Joan Pennington; R. M. Fitz-Gerald

[57] ABSTRACT

Apparatus is provided for the control of a video tape or cassette recorder by a microcomputer. The apparatus is interfaced to the video recorder for the input and output of various control signals via the remote control connector of the video recorder. The apparatus also includes interconnections to a microcomputer, a monitor and the audio and video signals of the video recorder. The apparatus under the control of the microcomputer controls operation of the video recorder and selectively supplies either video recorder video or microcomputer video to the monitor and independently supplies one of the two audio channels of the video recorder or no audio to the monitor. The apparatus under keyboard inputs from the microcomputer controls transport functions of the video recorder including rewind, fast forward, various play speeds, stop and pause. The apparatus also controls random access and presentation of addressable frame segments and locations of a video tape or cassette and maintains an accurate frame count throughout various transport functions with respect to an accurately defined starting point.

9 Claims, 7 Drawing Figures

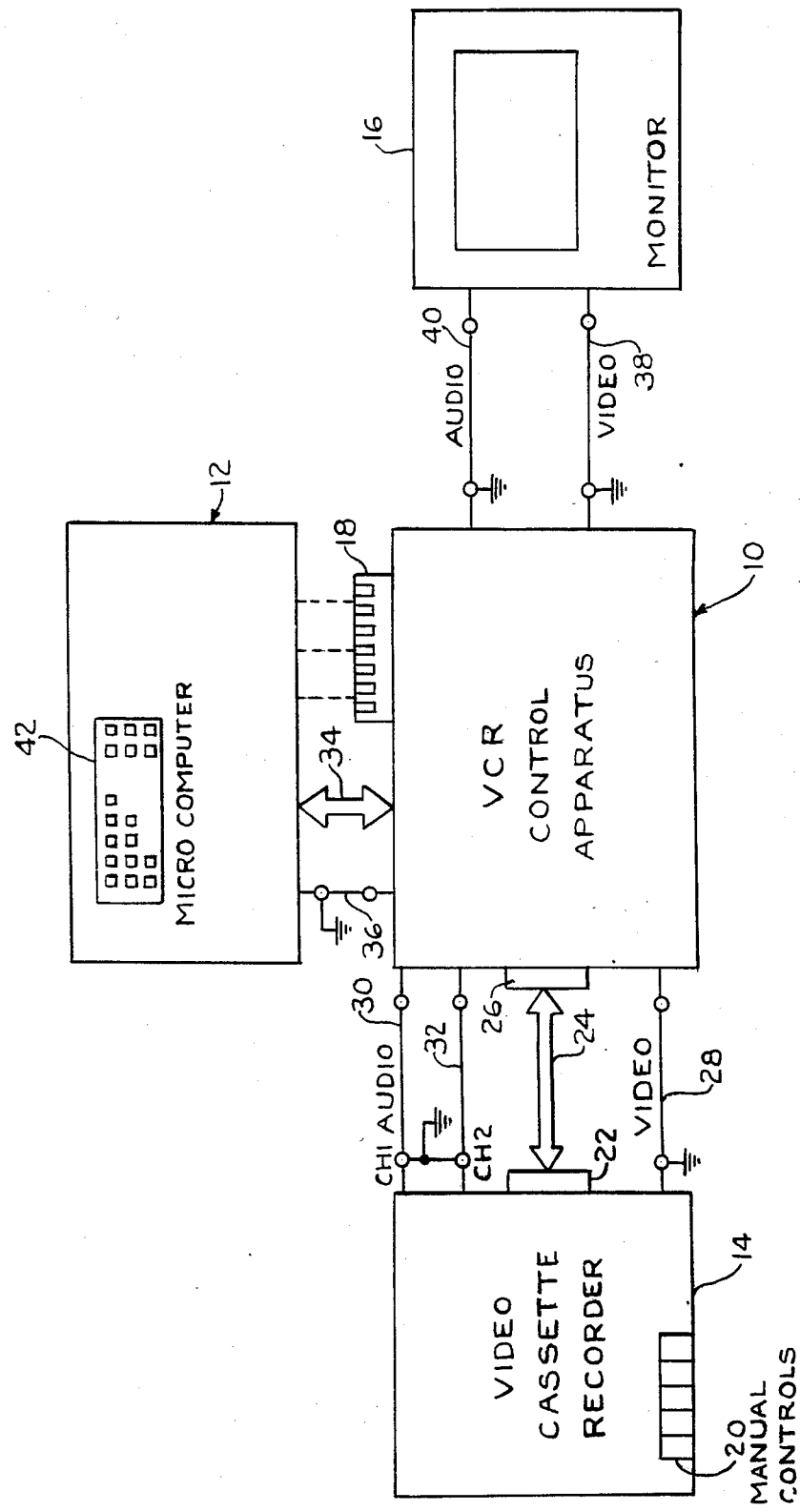

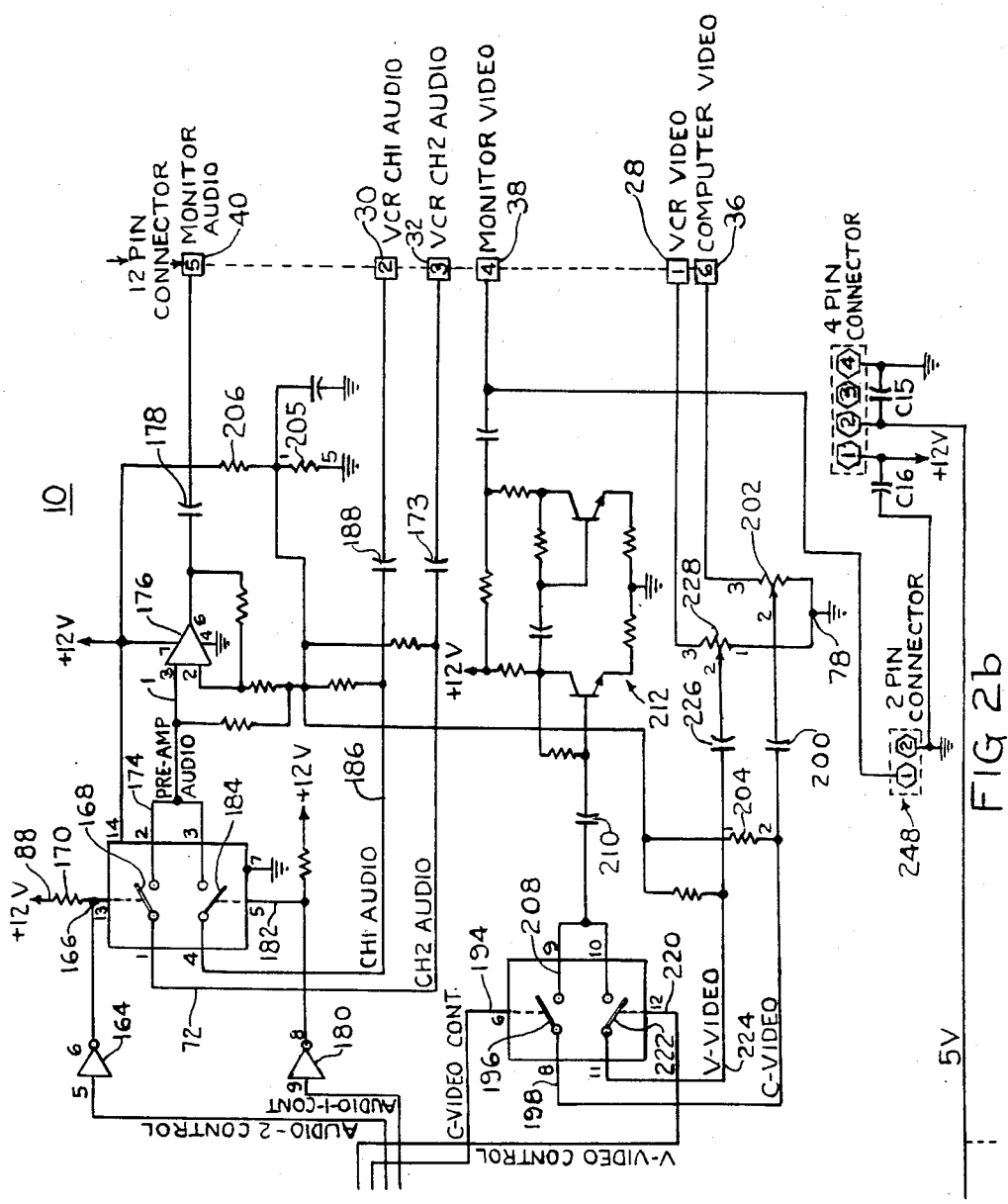

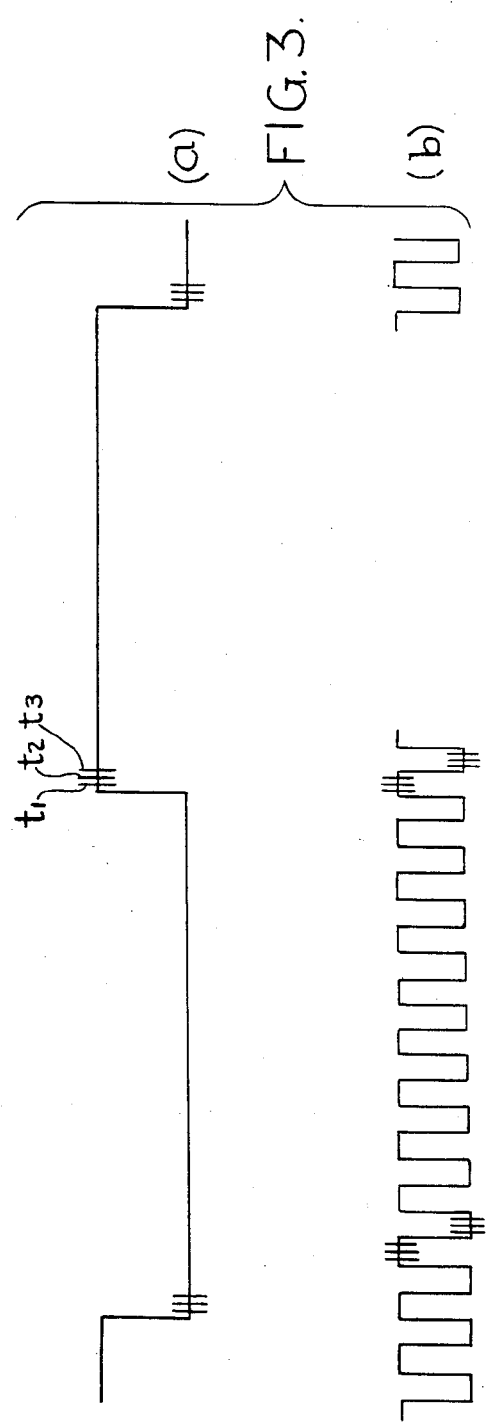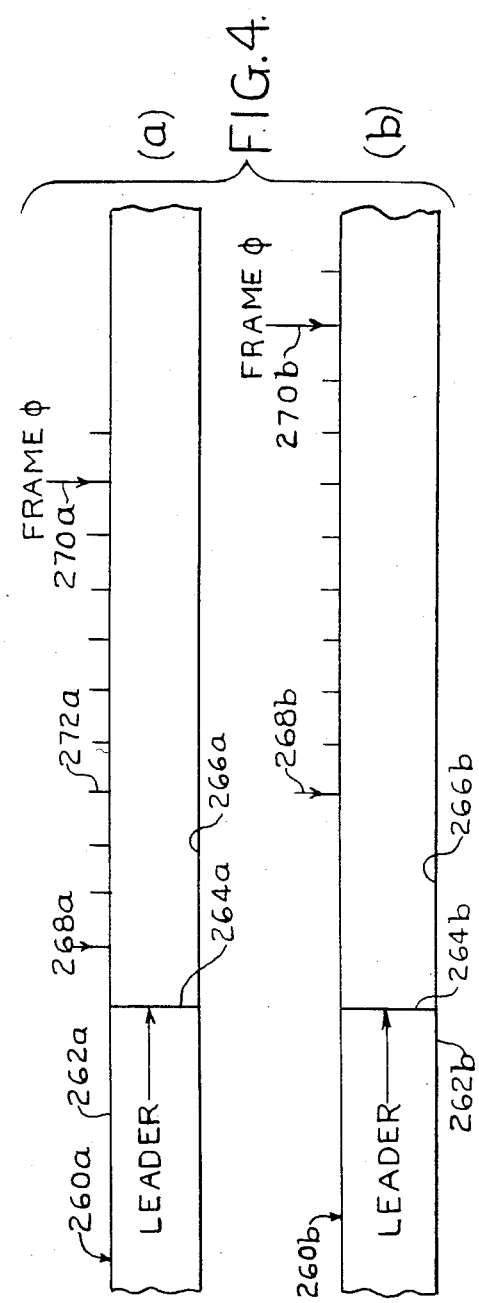

CONTROL ARRANGEMENT AND METHOD FOR VIDEO TAPE RECORDER

BACKGROUND OF THE INVENTION

The present invention relates generally to the field of video recorder control arrangements and more specifically to improved method and apparatus for controlling the operation of a video cassette or tape recorder by a microcomputer.

Various apparatus have been proposed to control video cassette recorders. For example, arrangements for use with video cassette recorders are disclosed in the following U.S. Pat. Nos.: 3,939,491; 3,988,778; 3,987,484; 3,739,086; 3,761,611; 3,934,268; 4,065,795; 4,120,006; 4,151,566; 3,546,161; 3,851,116; 3,681,524; 3,732,364; 4,040,100; 3,921,220; 4,028,733; 4,065,794; 3,925,815; 3,900,887; 3,890,639; and 3,509,549. Further, European patent document No. 008,124 and German patent document No. 28,35,077 are also directed to video cassette recorder control arrangements.

While these arrangements are generally suitable for their intended use, it would be desirable to provide an improved method and apparatus for the control of a video cassette recorder.

SUMMARY OF THE INVENTION

Accordingly, it is a principal object of the present invention to provide a method and an apparatus to control a video cassette recorder by a microcomputer with accurate frame addressing of a video cassette throughout various transport functions and with respect to an accurately defined starting point.

It is another object of the present invention to provide control apparatus for a video cassette recorder that provides various audio and video combinations to a monitor including one of two audio channels from the video cassette recorder, no audio, cassette recorder video, or microcomputer video.

These and other objects of the present invention are efficiently achieved by providing apparatus for the control of a video cassette recorder by a microcomputer. The apparatus is interfaced to the video cassette recorder for the input and output of various control signals via the remote control connector of the video cassette recorder. The apparatus also includes interconnections to a microcomputer, a monitor and the audio and video signals of the video cassette recorder. The apparatus under the control of the microcomputer controls operation of the video cassette recorder and selectively supplies either video cassette recorder video or microcomputer video to the monitor and independently supplies one of the two audio channels of the video cassette recorder or no audio to the monitor. The apparatus under keyboard inputs from the microcomputer controls transport functions of the video cassette recorder including rewind, fast forward, various play speeds, stop and pause. The apparatus also controls random access and presentation of addressable frame requests and location of a video cassette and maintains an accurate frame count throughout various transport functions with respect to an accurately defined starting point.

The invention both as to its organization and method of operation together with further objects and advantages thereof will best be understood by reference to the following specification taken in conjunction with the accompanying drawings.

BRIEF DESCRIPTION OF THE DRAWING

FIG. 1 is a block diagram representation illustrating the control apparatus for a video cassette recorder of the present invention in conjunction with a microcomputer, a monitor and the video cassette recorder;

FIGS. 2a and 2b when assembled together electrical schematic and block diagram representations illustrating the control apparatus of FIG. 1 showing the interconnections to the microcomputer, the monitor and the video cassette recorder.

FIGS. 3a and 3b are timing waveform representations of the control track frame pulses transduced from the control track of a video cassette recorder at two different transport speeds to illustrate the determination of valid control pulses in accordance with the present invention; and FIGS. 4a and 4b are diagrammatic representations of the beginning portion of two video cassette tapes illustrating the relationship between the tape beginning signal location and the control track frame pulses.

DESCRIPTION OF THE PREFERRED EMBODIMENT

Figure 2A:
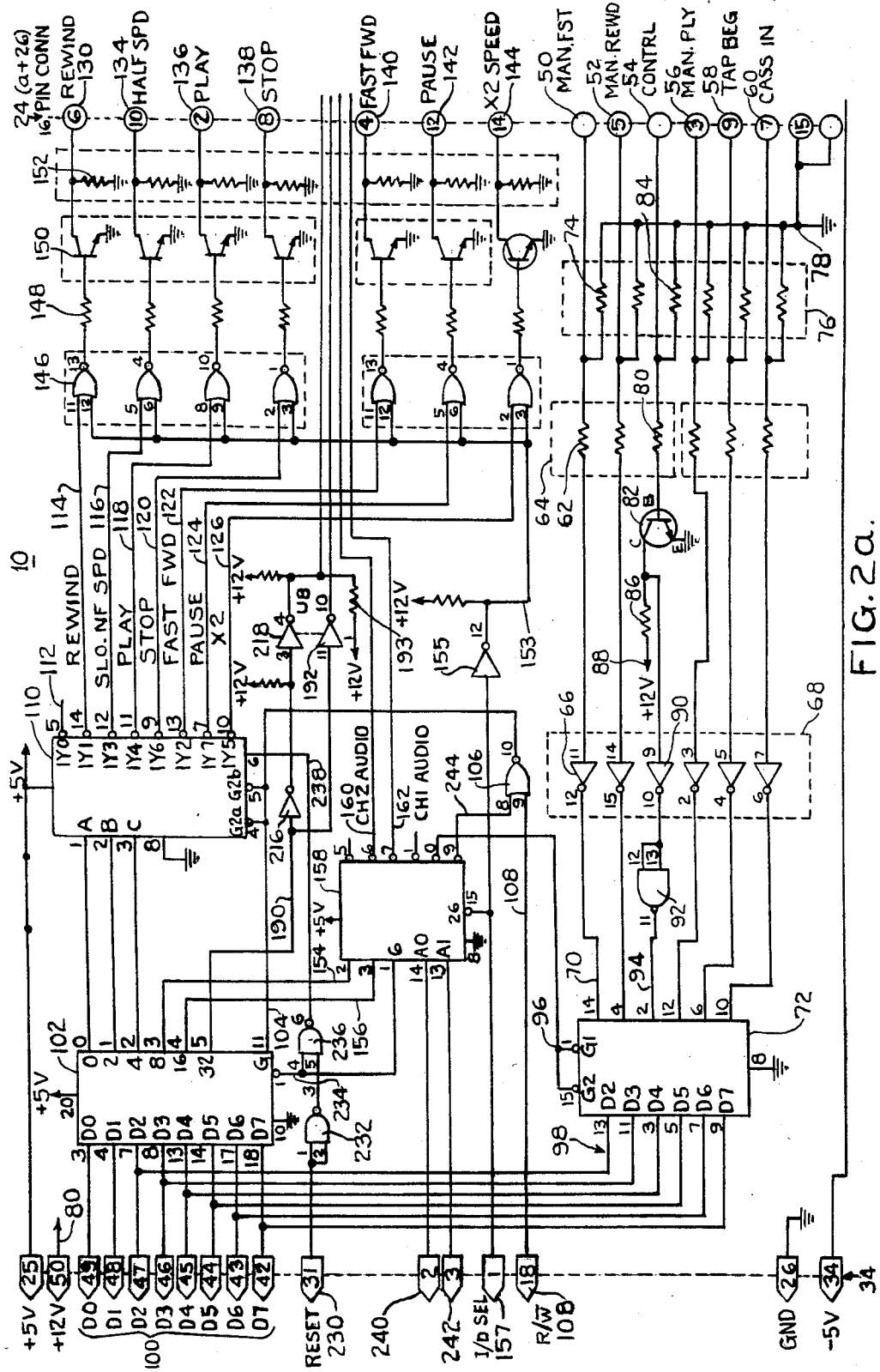

Referring now to FIG. 1, the video cassette recorder (VCR) control apparatus referred to generally at 10 is illustrated as interconnected with a microcomputer referred to generally at 12, a video cassette recorder or VCR 14 and a monitor 16. The VCR control apparatus 10 under the control of the microcomputer 12 controls operation of the video cassette recorder 14 in accordance with operator commands entered on the microcomputer 12 via keyboard 42, for example, or by program entry for appropriate audio and video presentation on the monitor 16. For example, the VCR control apparatus 10 provides signal conditioning of input and output signals to and from the VCR 14 and the microcomputer 12 and switching control of audio and video signals from the VCR 14 and a video signal from the microcomputer 12 to the monitor 16. In a preferred embodiment the VCR control apparatus 10 is provided as a video interface printed circuit card for insertion into an expansion slot of the microcomputer 12 via an edge connector 18. In a preferred embodiment, the microcomputer 12 is a Bell to an ampersand & Howell microcomputer manufactured by Apple Computer Inc. including a disc drive, such as an Apple II Plus.

The VCR 14 includes manual controls generally referred to at 20 and a remote multiple lead connector 22. The VCR control apparatus 10 via multiple lead interconnection cable 24 connected to the remote connector 22 senses operational status of the VCR 14 and provides operational control signals to the VCR 14 in accordance with control by the microcomputer 12. The VCR controller apparatus 10 receives the video output of the VCR 14 over coaxial cable interconnection 28 and receives channel 1 audio output signals and channel 2 audio output signals from the VCR 14 over respective audio interconnections 30 and 32. The VCR controller apparatus 10 is interconnected with the microcomputer 12 for the input and output of signal information as represented by the multi-lead bus 34 which in the preferred embodiment is accomplished by connection pins on the edge connector 18 upon insertion into the microcomputer 12. Further the microcomputer 12 supplies a computer video output signal at 36 to the VCR controller apparatus 10. The VCR controller apparatus 10 provides a video output signal over line 38 and an audio signal over line 40 to the monitor 16.

Accordingly, the VCR controller apparatus 10 under the control of the microcomputer 12 by appropriate entry on the keyboard 42 of the microcomputer 12 selectively controls operation of the VCR 14 and the outputting of various audio and video combinations on lines 40, 38 respectively to the monitor 16. For example, the monitor 16 is selectively supplied with any one of the following combinations:

| VIDEO | AUDIO |
| --- | --- |
| VCR | Channel 1 |
| VCR | Channel 2 |
| VCR | no audio |
| Computer | no audio |
| Computer | Channel 1 |
| Computer | Channel 2 |

Additionally, the VCR controller apparatus 10 controls the transport and transducing functions of the VCR 14, for example, including rewind, half speed operation, play operation, stop, fast forward, pause, and twice normal speed play operation. Further, the VCR control apparatus 10 receives status information of operation of the VCR 14 representing the video cassette being properly inserted, tape beginning, manual play actuation, manual rewind operation, manual fast forward operation and control track frame signal information.

In accordance with important aspects of the present invention, the VCR control apparatus 10 under microcomputer control maintains an accurate frame address status of the video cassette inserted in the video cassette recorder 14 in accordance with a predetermined frame zero start point defined by the microcomputer 12 and further provides for transport operation to desired frame addresses and play operation of desired frame segments defined in accordance with frame addresses.

In accordance with the program being run in the microcomputer 12 for VCR control as loaded by disc for example, the VCR 14 can be controlled in a number of different modes for a number of different purposes. For example, a first program provides for operational control of the VCR 14 for the selection of desired tape segments and also provides for the playback recording and editing of stored tape segments such as title files. The keyboard 42 for this first program includes an assignment of various keys to accomplish various editing functions. A second type of program maps various keys on the keyboard 42 to correspond directly to the individual operational modes of the VCR 14 such as corresponding to the manual controls and additional controls. Reference may be made to the Bell & Howell Video Interface Card 1982 publication for a more detailed discussion of the types of programs and the various control functions and uses of the VCR control apparatus 10. Further reference is also directed to the VCR driver assembly listing contained hereinafter in the specification. For illustrative purposes, specific VCR apparatus suitable for use with the present invention includes SONY model SLO-320, Sony Model SLO-323, or Panasonic model NV-8200.

Referring now additionally to FIGS. 2a and 2b identical reference numbers as used hereinabove with respect to FIG. 1 are employed to describe identical components and devices, the VCR control apparatus 10 receives status information from the VCR 14 over the following control lines of the interconnection cable 24 at connector 26: manual fast forward line 50, manual rewind line 52, control track frame pulse line 54, manual play line 56, tape beginning line 58, and cassette in inserted position line 60. The manual fast forward line 50 is connected through a series resistor 62 of an integrated resistor array 64 and an inverter gate 66 of a hex inverter circuit package 68 to a first data input 70 of a buffer register or data latch stage 72. The manual fast forward line 50 is also connected through a resistor 74 of an integrated resistor array 76 to a ground reference potential at 78. Each of the input lines 52, 56, 58 and 60 are also similarly connected through a respective series resistor and a respective inverter gate to a respective data input of the buffer register 72.

The control track frame signal line 54 is connected through a series resistor 80 of the array 64 to the base of an NPN transistor 82. The line 54 is also connected through a resistor 84 of the array 76 to the ground potential 78. The emitter of the transistor 82 is connected to the ground potential 78. The collector of the transistor 82 is connected through a resistor 86 to a +12 volt line at 88. The collector of the transistor 82 is connected through an inverter gate 90 of the circuit 68 and through a NAND gate 92 connected as an inverter through a respective data input 94 of the buffer register 72.

Accordingly, the data input signals to the buffer register 72 are converted to appropriate digital logic levels in a zero to five volt level range from the zero to 12 volt input signal range at the lines 50, 52, 54, 56, 58 and 60. The signal on the control track frame pulse line 54 is a 30 hertz or 60 hertz square wave signal depending on the type of VCR 14. The transistor 82 and gate 92 are provided to sharpen or square up the signal. The resistors such as 74 serve to terminate any open inputs of the inverter gates such as 66 and provide a measure of electrostatic discharge path to ground. Similarly, the resistors such as 62 in the array 64 provide electrostatic isolation of the inputs to the inverter gates 66 from the interconnection wire or cabling of lines 24.

The buffer register 72 with an appropriate zero logic level transition at line 96 to the G1, G2 inputs transfers the data at the six data input lines such as 70 to respective output lines at 98 connected to the data lines designated D2, D3, D4, D5, D6, and D7 of the data bus 100 of the bus 34 of the microcomputer 12. Accordingly, when the buffer register 72 is appropriately controlled at 96, the digital input status corresponding to the various status lines of the VCR 14 are provided to the microcomputer 12 via the data bus lines 98.

The data bus of the microcomputer 12 is a bidirectional bus and in addition to providing the input status of VCR signals also provides output control information from the microcomputer 12 to appropriately control the VCR 14.

The computer data bus lines D0–D7 at 100 are provided at respective data inputs of a data latch 102. The data latch 102 includes a gating signal at a G input at line 104 that is derived at the output of a two-input NOR gate 106. One input of the NOR gate 106 is connected to a read/write control line 108 of the computer bus 34. An appropriate gating pulse at the G input on line 104 to the data latch 102 transfers the contents of the data bus lines D0–D5 to the data outputs which remain latched after the gating pulse. The latched data outputs of the data latch 102 at coded bit position outputs 0, 2, 4, 8, 16 and 32 correspond to latch data bus data bits 0, 1, 2, 3, 4 and 5.

The data bits 0, 1 and 2 from data latch 102 are connected respectively to the A, B, and C inputs of a 3 to 8 decoder stage 110. The 8 outputs 112, 114, 116, 118, 120, 122, 124 and 126 are each respectively and independently configured to a low logic state with the proper digital combination of ones and zeros on the three inputs A, B, and C. For example, with an A, B, C combination of 1, 1, 0, the output 116 corresponding to slow/half speed VCR operation is driven to a low logic level state with the remaining 7 outputs being conditioned to a high level.

Similarly, various other digital data bit combinations on the A, B, C, inputs result in respective actuation to a low logic level of one of the corresponding data latch outputs and the designated VCR operational mode as follows: 114 rewind; 118 play; 120 stop; 122 fast forward; 124 pause; and twice normal play speed 126. The gating signal 104 is also applied to the decoder 110 at inputs G2A and G2B.

The interconnection cable 24 at connector 26 includes output control signal lines to the VCR 14 including a rewind control line 130, half speed control line 134, a play control line 136, a stop control line 138, a fast forward control line 140, a pause control line 142 and a times 2 or twice normal speed control line 144.

The decoded rewind output 114 of the decoder 110 is connected to one input of a two-input NOR gate 146. The output of the NOR gate 146 is connected through a series resistor 148 to the base of an NPN transistor 150. The emitter of the transistor 150 is connected to ground potential 78 and the collector of the transistor 150 is connected to provide the rewind output control line 130. A resistor 152 is connected between the collector of the transistor 150 and ground potential 78. The second input of the NOR gate 146 is connected to an in/out selection line 153 labelled I/O SEL. The in/out selection signal 153 is provided at the output of an inverter gate 155. The input of the inverter gate 155 is connected to an inverted I/O selection line at 157 from the microcomputer bus 34.

When the proper combination of digital data bits at the ABC inputs of the decoder 110 are present, the rewind line 114 is conditioned to a low level. With the I/O line 153 providing an appropriate low level to the gate 146 corresponding to the output control condition of the VCR, the gate 146 through resistor 148 renders the transistor 150 conductive to provide a low operational state control level at the rewind control line 130 to condition the VCR 14 to the rewind mode via the interconnection lines 24 and the remote connector 22 of the VCR 14.

Similarly, each of the decoded outputs of the decoder 110 is connected through a respective NOR gate, resistor, and transistor arrangement such as the elements 146, 148 and 150 discussed hereinbefore to provide the appropriate output control signal at the corresponding control line 130, 134, 136, 138, 140, 142 or 144 to the VCR 14.

The 3 and 4 data bit outputs of the data latch 102 are connected respectively at 154 and 156 to the A and B inputs of a two-input to four-output decoder stage included within a two decoder stage package 158. The A and B inputs on the respective lines 154 and 156 control decoded outputs 1Y1, 1Y2 and 1Y3 of the circuit 158.

With appropriate data bit inputs from the data bit lines 3 and 4 to the A and B inputs, respectively, the corresponding one of the decoded output lines 1Y1, 1Y2, and 1Y3 is selected with the 1Y1 output corresponding to a no audio selection, the 1Y2 decoded output at 160 corresponding to an audio channel 2 control selection and the 1Y3 output at 162 corresponding to an audio channel 1 control selection. For example, a low logic level on input A from line 154 and a high logic level on input B from line 156 results in the 1Y2 output going low to control the corresponding audio channel 2 selection output.

The audio channel 2 output control signal at 160 is connected through an inverter gate 164 to a switch control input 166 of an analog switch denoted at 168. The control input 166 is also connected through a resistor 170 to the +12 volt supply reference 88 of the microcomputer 12. One side of the switch 168 at input 172 is connected to the audio channel 2 signal 32 of the VCR 14 through a capacitor 173. The output 174 of the switch 168 is connected to the input of an audio preamplifier stage 176. The output of the amplifier 176 is connected through a capacitor 178 to the monitor audio output line 40.

With the audio channel 2 control line 160 at a low level, the switch control line 166 is a high level to close the switch 168 and provide the audio channel 2 signal from the input 30 of the VCR to the monitor audio output 40 with appropriate amplification control. Similarly, the audio channel 1 control signal 162 is connected through an inverter gate 180 to a switch control input 182 of a switch denoted at 184. The switch 184 is closed when actuated by control line 182 to connect the input 186 to the output which is connected to the input 174 of the preamplifier stage 176. The input 186 of the switch 184 is connected through a capacitor 188 to the VCR audio channel 1 input signal 30. Accordingly, when the audio channel 1 control signal 162 is a low logic level, the switch 184 is actuated and the audio channel 2 signal 32 is provided to the monitor at 40.

Accordingly, a 0, 1 input to the A, B inputs of the decoder 158 selects audio channel 2 of the VCR 14 for presentation to the monitor 40 while a 1,1 input on the A, B lines to the decoder 158 selects audio channel 1 for the monitor output at 40. With a 0,0 or 1,0 input to the A, B inputs of the decoder 158, neither of the audio control lines 160 and 162 is selected and no audio is output to the monitor audio control line 40.

The data bit 5 control line of the data latch 102 at 190 is utilized to control the selection of either the computer video input at 36 or the VCR video input at 28 for connection to the monitor video output at 38. Specifically, the data line 190 is connected through an inverter gate 192 to a switch control input 194 of a first analog switch denoted at 196. An input 198 of the switch 196 is connected through a capacitor 200 to the wiper arm of a potentiometer 202. The potentiometer 202 is connected in series between the computer video input signal 36 and the ground potential 78. The input 198 of the switch 196 is also connected through a resistor 204 and a resistor 206 to +12 volt supply reference 88. A resistor 205 is connected between ground potential 78 and the junction of the resistors 204, 206. The output 208 of the switch 196 is connected through a capacitor 210 to a video amplifier stage referred to generally at 212. The output of the video amplifier stage 212 is connected to the monitor video line 38. Accordingly, when the digital state of data bit 5 at 190 corresponds to a low level, the switch 196 is activated and computer video is provided to the monitor video output 38.

The data bit 5 output at 190 is also connected through two inverter gates 216 and 218 to a control line 220 of an analog switch stage denoted at 222. The input 224 of the switch 222 is connected through a capacitor 226 to the wiper arm of a potentiometer 228. The potentiometer 228 is connected between the VCR video input 28 and the ground potential 78. Accordingly, when the data bit 5 is a high level at 190, the switch 222 is actuated to select VCR video for provision to the monitor video output line 38.

Adjustment of the potentiometer 202 provides level control of the computer video output to the monitor output 38 and adjustment of the potentiometer 228 provides level control of the VCR video output to the monitor output 38. Accordingly, the video levels from the VCR and the microcomputer are independently adjustable.

The bus 34 from the microcomputer 12 includes a reset input 230 that is connected through a NAND gate 232 arranged as an inverter to provide at 234 the inverted reset signal to the data latch 102 and a gate signal at the G input to the decoder 158. The inverted reset signal 234 is also connected through another NAND gate 236 arranged as an inverter to provide an output at 238 connected to the G input of the decoder 110. Two timing control signals A0 signal at 240 and A1 at 242 are connected to the respective A0, A1 inputs of a second 2 to 4 decoder of the decoder circuit 158. The 2Y2 output of the second decoder stage of 158 provides the pulse gating signal 96 to the buffer register 72. The 2Y3 output at 244 of the second decoder circuit of the stage 158 is connected to the second input of the NOR gate 106 that provides the gating signals to the data latch 102 and the decoder stage 110. Accordingly, the digital state of the A0 signal 240 and the A1 signal 242 control the input of status information from the VCR to the microcomputer 12 via line 96 at the 2Y2 output. Further, the signals A0 and A1 control the 2Y3 output which along with the read/write line 108 through gate 106 control the transfer of data through devices 102 and 110.

A video reference output signal is provided at output connector 248 from the monitor video output 38 for use, for example, as a light pen reference signal.

Referring now to FIG. 3, FIG. 3a depicts the 30 hertz or 60 hertz square wave signal provided by the VCR 14 at the control track frame signal line 54 at normal play speed while FIG. 3b illustrates the same type control track wave form when the VCR 14 is transporting tape at a high rate of speed approximately 20 times the normal play rate such as encountered in fast forward or rewind, for example. For illustrative purposes assume that the FIG. 3a waveform corresponds to a VCR of the type that produces a 60 hertz waveform. The microcomputer 12 receives status information on the data bus 100 with the data line D4 corresponding to the information on the control track so that the microcomputer 12 in accordance with desired operating parameters of the stored program can address and locate desired tape frames and segments.

To this end and in accordance with important aspects of the present invention, the microcomputer 12 via the control frame information must accurately detects valid pulse information corresponding to control frames at various operational transport speeds. Accordingly, the microcomputer 12 at a predetermined rate, for example, every 110 microseconds, and for three samples, such as indicated at t1, t2 and t3, monitors the status of the control line 54 as a digital signal on data line D4 for determination of a valid control pulse when a high logic level is detected at three consecutive intervals and a low logic level is detected at three consecutive intervals thereafter.

Thus, when the VCR 14 is transporting tape at a high rate, for example, 20 times the normal play rate, a valid control pulse will be detected utilizing the same sampling frequency and method since the sampling intervals for valid pulse detection are selected close enough in time to be assured of occurrence within a single control pulse at the highest operational speeds. Further, for a VCR 14 of the type that produces a 30 hertz waveform, either a different sampling rate can be utilized or valid pulses may be detected for tape transport speeds of 40 times normal play speed.

The microcomputer 12 and the video control apparatus 10 in accordance with the present invention maintain an accurate frame count for accurate addressing location and transport to desired frame segments and individual frames throughout all tape transport operation including high transport rates of fast forward and rewind as well as normal play, stop and pause operation, and throughout multiple combinations of these operations.

The stored program in the microcomputer 12 operates on an incremental frame counting basis such that initial frame numbering must be initialized at the beginning of each inserted video cassette.

Referring now to FIG. 4, FIGS. 4a and 4b represent portions of the video tape of a video cassette such as portions 260a of FIG. 4a and 260b of FIG. 4b. The tape portions 260a and 260b each include respective initial transparent or translucent leader portions 262a and 262b. The VCR 14 via appropriate detection circuitry such as a light emitting device and a detector locates the respective edge 264a or 264b of the leaders 262a or 262b and provides a tape beginning signal at signal line 58. The tape beginning signal at 58 is provided to the microcomputer 12 in digital format on data line D6 during the sensing of VCR input status.

As illustrated in FIG. 4, while the tape beginning signal on line 58 reasonably accurately depicts the end of the translucent or transparent leader 262a or 262b at 264a or 264b respectively and the beginning of the opaque coated tape portion 266a or 266b respectively, the use of the tape beginning signal 58 as an initializing signal to start the counting of frames is improved by the control apparatus 10 and the microcomputer 12 of the present invention. The first frame at 268a of the tape 260a in FIG. 4a occurs at a different distance relative to the leader edge 264a or tape beginning point than does the first frame 268b of the second tape 260b of FIG. 4b which illustrates a much larger distance corresponding to several frames of information.

Accordingly, if the microcomputer 12 on an incremental count basis uses a frame zero determination point at the tape beginning signal occurrence time, frame information and counting will be off by a number of frames which might exceed 10 or 20 frames of information, which is larger than the accuracy of the microcomputer 12 and control apparatus 10 of the present invention. Thus, to maintain as much accuracy as is possible, commonly within one or two frames due to rewind loss and discrepancies of the transport apparatus of various types of the VCR 14, the present invention counts a predetermined number of frames to the tape point 270a, for example, after the occurrence of a tape beginning signal at 264a and determines this frame as frame zero for accurate counting and reproducability and future presentations of the video tape. For example, in FIG. 4a each index notation such as 272a represents 10 frames and the frame zero point determined by the CPU 12 is 100 frames after the tape beginning. Thus, referring to FIG. 4b the frame zero reference 270b is 100 frames from the tape beginning signal and the ambiguity of the tape beginning signal as a frame zero signal has been eliminated.

Accordingly, the microcomputer 12 in accordance with the stored program determines as set forth hereinafter an accurate frame zero counting reference and thereafter during usage of the video cassette, the incremental frame count is accurately maintained during all subsequent transport operation including all fast forward, rewind, stop, pause and play segments.

In accordance with the present invention, the accurate frame count based on the frame zero determination is accurately maintained throughout all operation, for example, when performing a fast forward or rewind function to a particular desired frame number either in response to an input on the keyboard 42 or as recalled from memory for a predetermined tape segment program. Specifically, the microcomputer 12 via the VCR control apparatus 10 advances the VCR 14 in a fast forward or rewind mode for an appropriate interval until the microcomputer 12 determines that the tape is within a predetermined number of frames from the desired frame number. At this time, the microcomputer 12 and the VCR control apparatus 10 control the VCR 14 from the fast forward or rewind mode into play mode and advance at play speed while maintaining an accurate count of the frame number to arrive at the desired frame number within the accuracy allowed by the specific transport mechanism.

For example, considering a specific embodiment, if the present frame is 8500 and the microcomputer 12 is programmed in one form or another to address and locate the frame number 4500, the VCR 14 is conditioned in a rewind mode of high speed tape transport to rewind to frame 4400 and at this point the VCR 14 is conditioned to the play (forward) mode to slowly arrive at the 4500 frame count tape location. Thus, for programmed transport operation to lower frame numbers, rewind is used to overshoot the final desired target frame by 100 frames. Correspondingly, for programmed transport to higher frame numbers, fast-forward operation is used to undershoot the target frame by 100 frames or another suitable predetermined number of frames.

While there has been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. Control apparatus for controlling the operation of a video or cassette recorder in response to control signals from a microcomputer, the video recorder having first and second audio channel signals on two respective audio signal paths and a video signal on a video signal path, the control apparatus comprising: means for generating digital control signals responsive to the control signals from the microcomputer; control signal means responsive to digital control signals for generating audio and video selection signals; audio switching means responsive to said audio selection signals for selectively providing an audio monitor output of one of the first audio channel signal, the second audio channel signal and no audio in accordance with said digital control signals; and video switching means responsive to said video selection signals for selectively providing a video monitor output of one of the video recorder video signal and a computer generated video signal on a second video path in accordance with said digital control signals independently of said audio switching means and said audio signal selection, said digital control signals including at least data representations defining three audio selection states and two video selection states independent of said audio selection states.

2. The control apparatus of claim 1 wherein said control signal means comprises decoder means and said digital control signals comprise a plurality of binary coded data lines having a predetermined coded combination for each audio and video selection state.

3. The control apparatus of claim 2 wherein said digital control signals include a predetermined number of binary coded audio data lines and a binary coded video data line.

4. The control apparatus of claim 3 wherein said decoder means includes an audio decoder responsive to said binary coded audio data lines.

5. The control apparatus of claim 4 wherein said audio decoder outputs said audio selection signals on two audio control lines each corresponding to selection of one of said two audio channels.

6. The control apparatus of claim 1 further comprising a data bus interconnection including a predetermined number of data lines and input status monitoring means and an input/output selection signal input, said input status monitoring means being responsive to predetermined inputs from a remote control output of a video cassette recorder and including means responsive to said input/output selection signal input being in a first input state for providing on said data bus digital information representing the operational status of a video cassette recorder including fast forward, rewind, play, tape beginning, cassette inserted, and control frame track status.

7. The control apparatus of claim 6 further comprising operational control output means responsive to said data bus and said input/output selection signal being in a second output state for generating output control signals to control operation of a video cassette recorder on a predetermined number of control line outputs corresponding to the remote control inputs of a video cassette recorder.

8. The control apparatus of claim 7 wherein said control line outputs include operational control signals for the operational states of rewind, half speed, play, stop, fast forward, pause and twice speed operation of the video cassette recorder.

9. The control arrangement of claim 8 wherein said data bus includes a data line corresponding to and representing the state of each of a respective one of said predetermined inputs to said input status monitoring means, each of said data lines also corresponding to and representing the state of a respective one of said control line outputs.

* * * * *